US005444750A

United States Patent [19]

Stewart et al.

[11] Patent Number: 5,444,750

[45] Date of Patent: Aug. 22, 1995

[54] TALLY PUNCH MACHINE

[75] Inventors: William L. Stewart, Spring Lake Park; Leonard A. Miller, Ham Lake; Thomas H. Peterman, Farwell; Marlo G. Schoeneck; Richard J. Schoeneck, both of Garfield, all of Minn.

[73] Assignee: Bass Gambling Supplies Inc., Spring Lake Place, Minn.

[21] Appl. No.: 149,318

[22] Filed: Nov. 9, 1993

[51] Int. Cl.[6] .................... G06M 3/02; G06K 15/00

[52] U.S. Cl. .................... 377/8; 83/427; 235/375; 235/434

[58] Field of Search .................... 377/8; 235/375, 434; 83/427

[56] References Cited

U.S. PATENT DOCUMENTS

| | | | |
|---|---|---|---|
| 2,590,047 | 3/1952 | Shultz et al. | 235/432 |
| 3,027,068 | 3/1962 | Iwai et al. | 234/20 |
| 3,436,010 | 4/1969 | Spanjersberg | 234/34 |
| 3,780,939 | 12/1973 | Woodie | 234/115 |
| 3,995,545 | 12/1976 | Romeo et al. | 101/19 |
| 4,116,127 | 9/1978 | McInerny | 101/232 |
| 4,172,552 | 10/1979 | Case et al. | 235/380 |
| 4,204,637 | 5/1980 | Gray | 235/431 |
| 4,481,667 | 11/1984 | Price et al. | 382/65 |
| 4,532,421 | 7/1985 | Sasaoka et al. | 250/223 R |
| 4,566,109 | 1/1986 | Sanuga | 377/2 |
| 4,653,647 | 3/1987 | Hashimoto | 377/8 |
| 4,707,843 | 11/1987 | McDonald et al. | 377/8 |
| 4,858,123 | 8/1989 | Alexoff et al. | 364/412 |
| 4,977,583 | 12/1990 | Gorgone | 377/8 |
| 4,995,060 | 2/1991 | Hill | 377/8 |
| 5,008,519 | 4/1991 | Cunningham et al. | 235/383 |
| 5,128,520 | 7/1992 | Rando et al. | 235/375 |
| 5,156,397 | 10/1992 | Valenza, Jr. | 273/138 A |
| 5,208,445 | 5/1993 | Nahar et al. | 235/375 |
| 5,211,093 | 5/1993 | Horniak | 83/426 |

*Primary Examiner*—John S. Heyman
*Attorney, Agent, or Firm*—Ronald M. Anderson

[57] ABSTRACT

Apparatus for counting and selectively voiding tickets. An input bin is provided wherein a stack of tickets are initially queued. Using a conveyor, each ticket is advanced from the input bin past a sensing device. The sensing device detects the presence of each ticket and produces a signal indicative of the passage of each ticket past the sensing device. This signal is conveyed to an electronic counting device that maintains a cumulative total count of the tickets. The apparatus may be set to continuously count any tickets placed in the input bin or set to stop after counting a predetermined number of tickets. The apparatus also includes a punch that is selectively controlled to enable the optional voiding of each ticket as it is counted.

17 Claims, 9 Drawing Sheets

TALLY PUNCH MACHINE

FIELD OF THE INVENTION

The present invention generally relates to apparatus for counting items, and more specifically to apparatus for counting tickets or the like.

BACKGROUND OF THE INVENTION

The distribution of tickets has become widespread since the growth of various forms of gambling that rely upon validation of gaming tickets, prime examples being local, state, and national lotteries. Gaming tickets are manufactured and distributed to retail outlets for sale to customers. Because of the strict controls that are imposed by law on the handling and distribution of gaming tickets at all stages of distribution and sale, it is essential that any tickets not sold be counted and then voided or destroyed. These requirements have led to a demand for ways to keep track of the tickets distributed but not sold, since they are typically returned to the distributor or the gaming commission for credit.

In response to a requirement to verify the authenticity of racing tickets, a ticket reader designed to identify a mark on a ticket was developed, as disclosed in U.S. Pat. No. 4,204,637. The ticket reader disclosed in this patent device detects the presence of a ticket, causing the ticket to be advanced to a reading station where the mark on the ticket is scanned. If the identifying mark scanned from the ticket matches that found in a data base on an associated remote computer, the ticket is identified as valid, and the mark on the ticket is destroyed, using a punch that perforates the ticket. Designed simply to identify and invalidate single tickets fed into it, this device does not provide any mechanism for counting tickets.

In recent years, electronic devices have been developed for counting items, frequently using light sensors to detect the passage of each item past a point and digital circuits to maintain the count. One particular example, disclosed in U.S. Pat. No. 4,481,667, uses a light source and corresponding light detector; passage of an item through the device interrupts the light from the source striking the light detector. The signal produced by the light detector is input to an electronic counter, incrementing the count as each item passes the light detector. While such general purpose counters are useful in maintaining a running count of items, they are not designed to efficiently count tickets and do not include any provision for selecting a number of tickets to be counted or for selectively voiding tickets.

Accordingly, it is evident that there is a need in the gaming industry for a device that is designed specifically for electronically counting tickets and selectively voiding tickets as they are counted. In addition to simply counting a stack of tickets, the device preferably should be capable of automatically stopping alter counting a predefined number of tickets.

SUMMARY OF THE INVENTION

In accordance with the present invention, apparatus are provided for counting and selectively voiding tickets. The apparatus comprise an input bin that holds at least one ticket, and counting means for counting the tickets. The counting means include sensing means for sensing the passage of each ticket and producing a signal indicative of the passage, and an electronic counting device. The electronic counting device receives the signal from the sensing means, and in response to the signal, maintains a cumulative total of the tickets counted. Voiding means are provided for optionally canceling the tickets. The tickets are advanced from the input bin, past the counting means and the voiding means, on a conveyor.

Preferably, the voiding means comprise punch means for punching a hole in the tickets and select means for selectively turning the punch means on and off.

The apparatus further includes a switch coupled to and controlling the counting means, to enable the selection of one of a plurality of counting modes, including a first mode in which the conveyor automatically stops when a predetermined number of tickets has been counted, and a second mode in which the conveyor continues to run and any tickets placed in the input bin are counted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
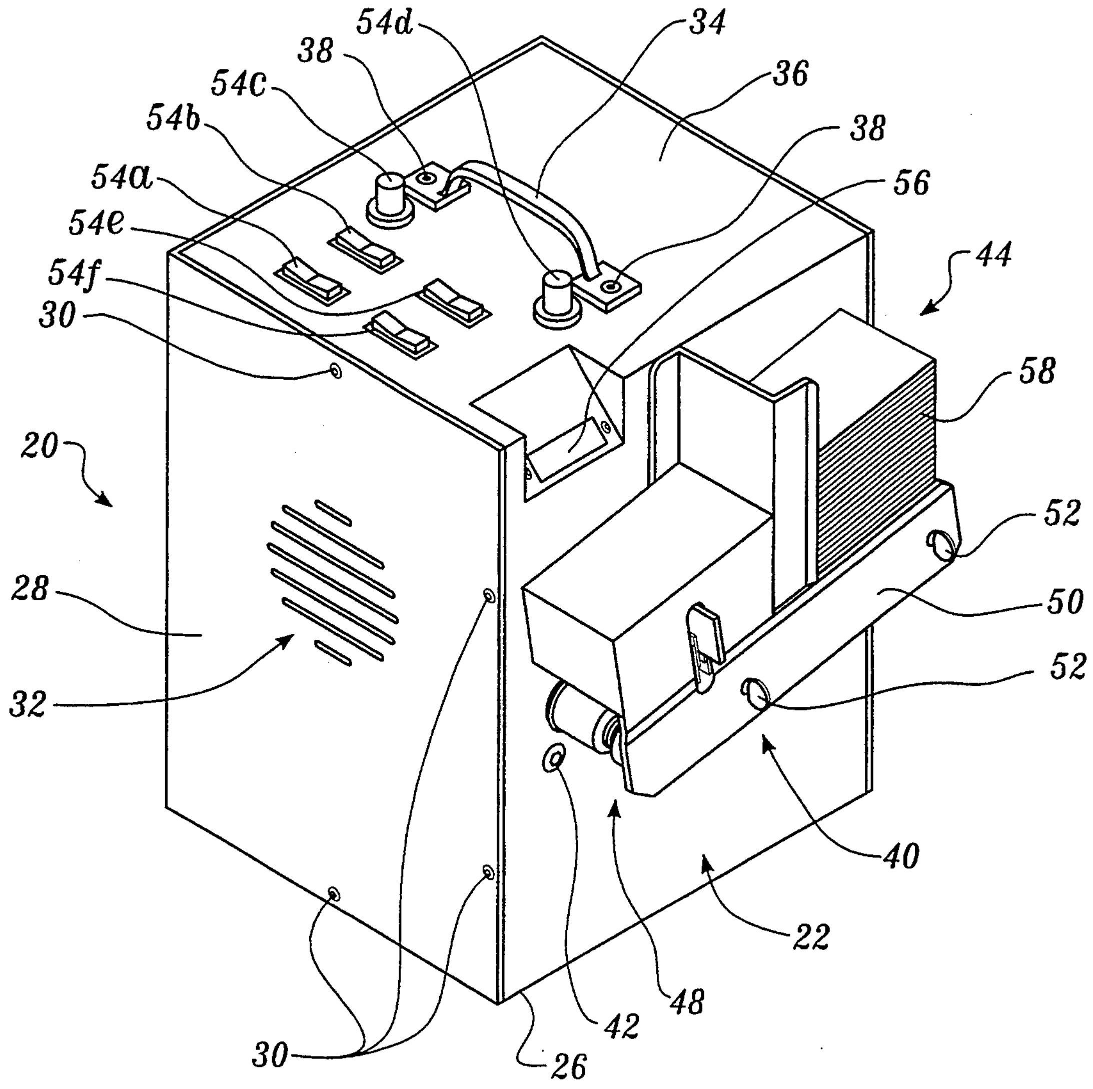
FIG. 1 is an isometric view of one embodiment of the tally punch machine, with a protective cover in place and showing a queued stack of tickets in an input bin.

A tally punch machine 20 made in accordance with the present invention is illustrated by FIGS. 1–10. As more specifically illustrated in FIGS. 1, 2 and 4, components of the tally punch machine are enclosed and or supported by an essentially box-shaped housing 22, which includes four support feet 24. These support feet are disposed on the bottom of a housing base 26 proximate to each corner. The housing also includes a removable cover 28 that facilitates access to the interior components of the tally punch machine. The removable cover is attached to the housing by means of a series of screws 30. A ventilation grill 32 is approximately centered in this cover to provide the interior of the housing with cooling ventilation. A handle 34 is mounted to a top 36 of the housing by means of two screws 38 to facilitate easy and convenient transport of the tally punch machine. A ticket station assembly 40 is attached to one side of housing 22 by means of screws 42. The ticket station assembly comprises a ticket input bin 44, a conveyor assembly 46, a ticket count and punch assembly 48, and a protective cover 50. The protective cover is held in place on conveyor assembly 46 and ticket count and punch assembly 48 by screws 52. A series of controls 54 are also disposed on the top of the housing and are used to control the operation and functioning of the tally punch machine. Specifically, switch 54*a* controls electrical power; switch 54*b* selects between a continuous counting mode and a mode for counting a predetermined number of tickets; the latter mode activates selection knobs 54*c* and 54*d*, which are used to set the predetermined number of tickets to be counted. Knob 54*c* selects a decade digit in the range from ten to 90, and is used alone or in conjunction with knob 54*d*, which selects the hundreds digit in the range from 000 to 900. Switch 54*e* resets a 4-digit digital display 56 to "0000," and switch 54*f* controls the functioning of conveyor assembly 46 and ticket count and punch assembly 48.

Figure 2:
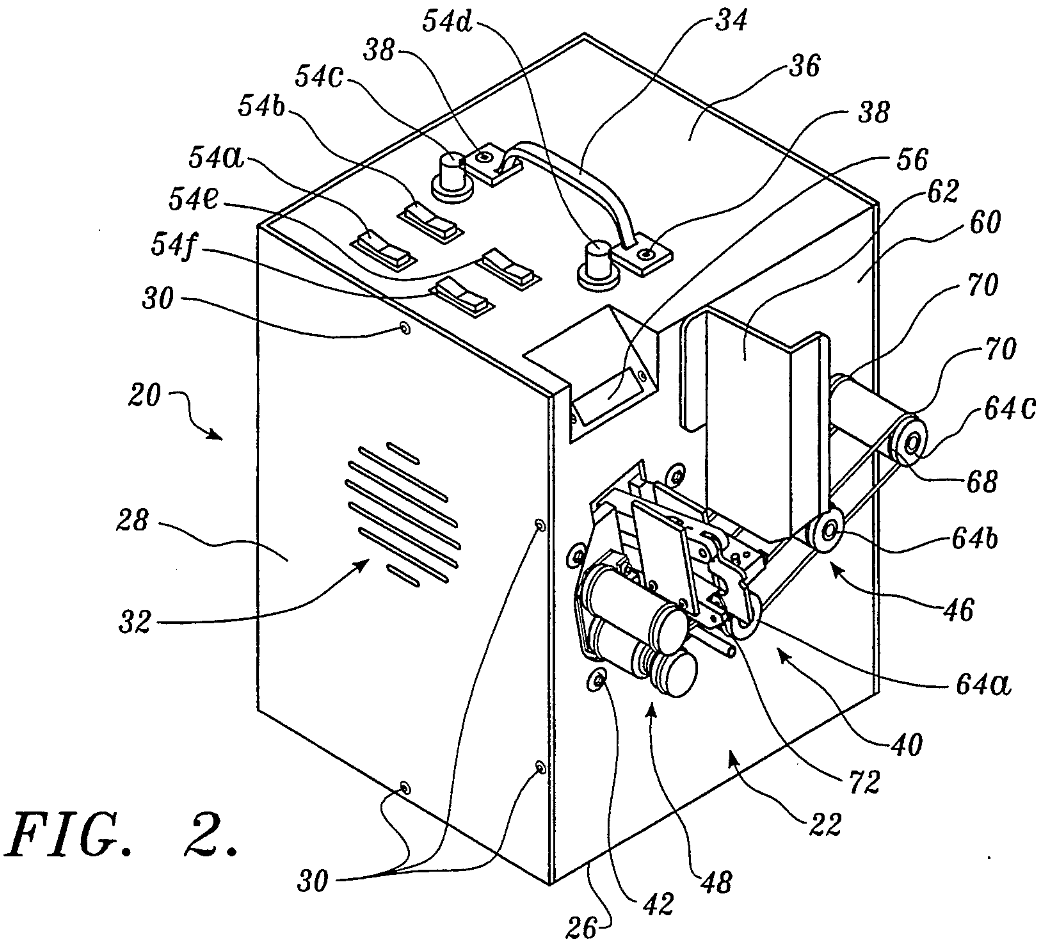
FIG. 2 is an isometric view of the tally punch machine, with the protective cover removed.
Figure 4:
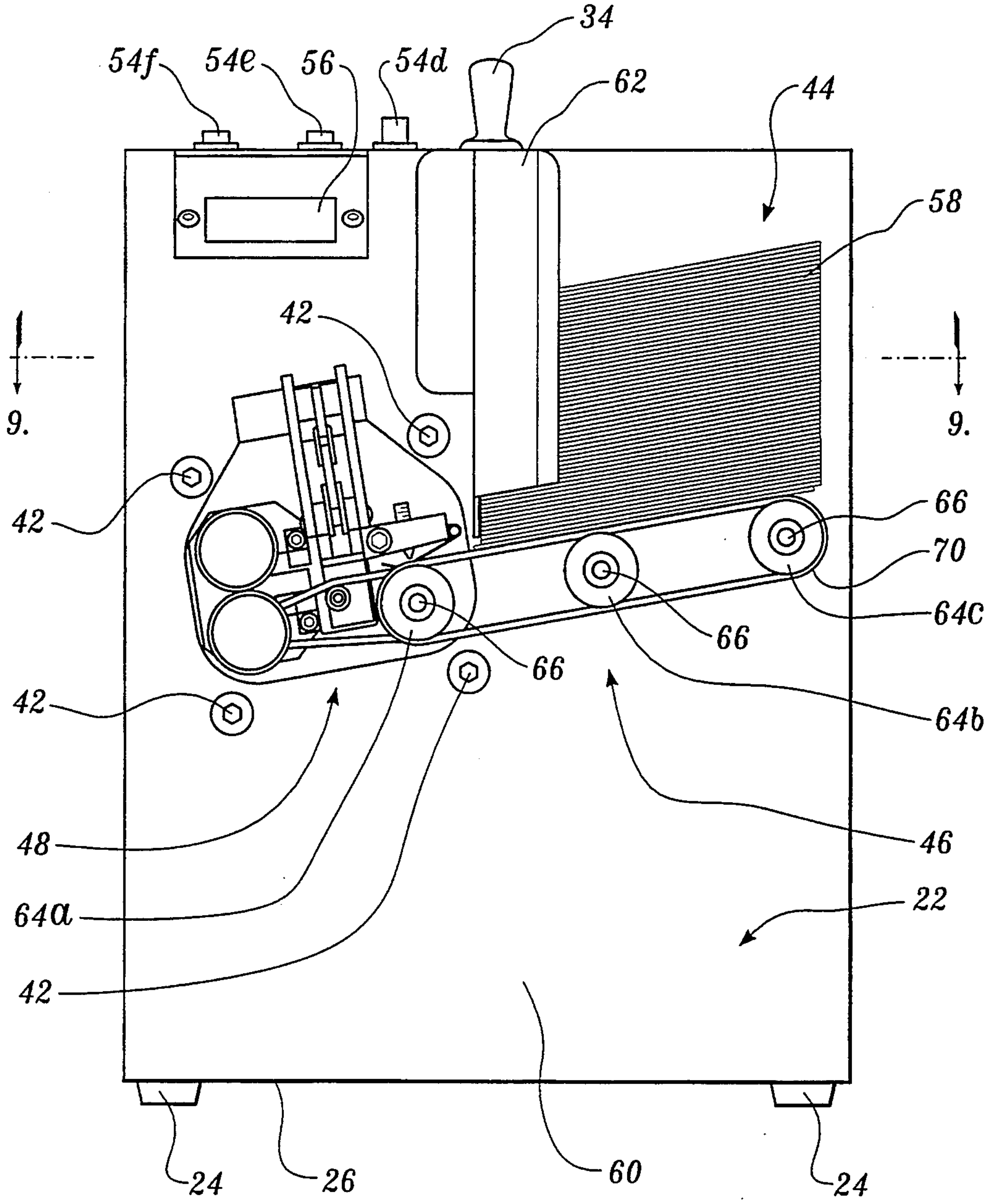
FIG. 4 is a front elevational view of the tally punch machine, with the protective cover removed and showing the queued stack of tickets in the input bin.

Input bin 44 is more clearly understood by referring to FIGS. 1, 2, and 4. The input bin provides a vertical queue area into which quadrilaterally shaped sheets of cardstock or paper material, i.e., a stack of tickets 58, may be placed. The bottom of the input bin is defined by conveyor assembly 46. The vertically stacked tickets are held in place by a sidewall 60 of housing 22, a bracket 62 that is affixed to sidewall 60 of the housing, and by a portion of protective cover 50.

Figure 3:
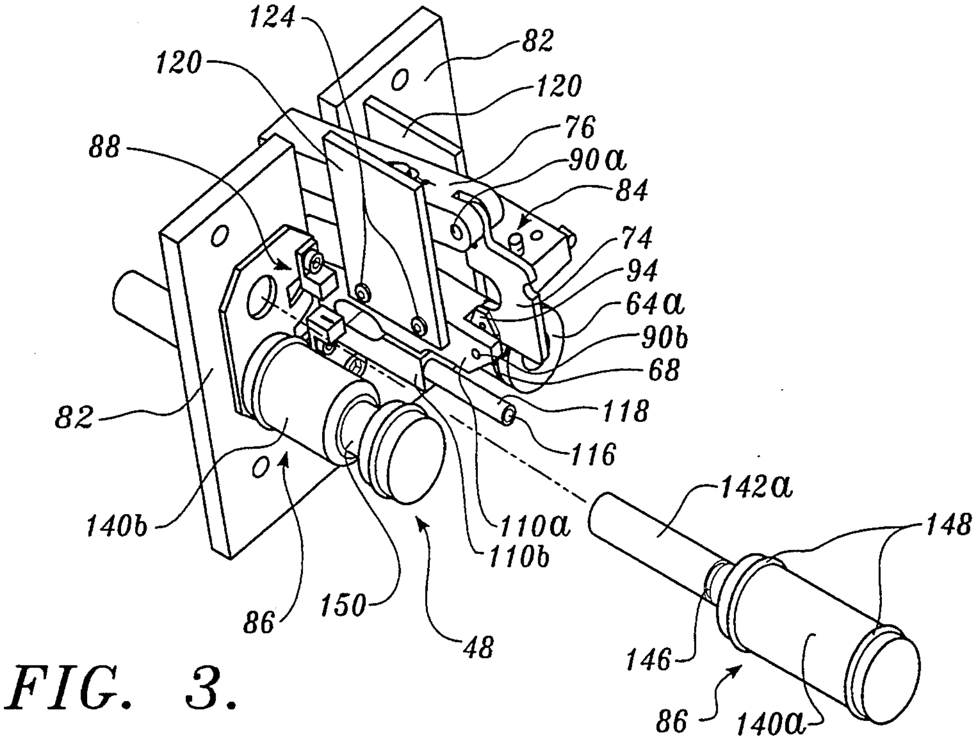
FIG. 3 is an expanded fragmentary isometric view of a ticket count and punch assembly of the tally punch machine.

With reference to FIGS. 2, 3, and 4, it can be seen that conveyor assembly 46 has three conveyor rollers 64, each supported by a corresponding roller rod 66, around which one of the conveyor rollers freely rotates. The roller rods, in turn, are mounted to sidewall 60 of housing 22 at successively lower positions, providing a downward slope from input bin 44 to ticket count and punch assembly 48, to facilitate movement of the tickets along the conveyor assembly. Each conveyor roller 64 has an annular groove 68 formed around its circumference, adjacent each end. Grooves 68 have a semi-circular cross-section. Two conveyor belts 70, each preferably comprising an O-ring, span all conveyor rollers 64 and are seated in grooves 68 on the three rollers.

Conveyor roller 64*a*, located closest to ticket count and punch assembly 48, has an annular conveyor drive groove 72 formed in its center and is coupled to, and drivingly rotated by, the ticket count and punch assembly. As conveyor roller 64*a* is drivingly rotated by the ticket count and punch assembly, conveyor belts 70 drivingly rotate conveyor rollers 64*b* and 64*c*, thereby creating conveyor movement in the conveyor assembly that advances tickets 58 from input bin 44 along conveyor assembly 46 to ticket count and punch assembly 48.

Ticket count and punch assembly 48 can best be understood by reference to FIGS. 3, 5, 6, 6A, and 7. The chief components of the ticket count and punch assembly are a lever 74, an arm 76, a base 78, a punch rod 80, a support plate 82, a friction pin assembly 84, an output roller assembly 86, and a sensor assembly 88.

Lever 74 enables an operator to selectively set ticket count and punch assembly 48 to punch each ticket that is counted to void or invalidate the ticket. The lever is connected at its top to arm 76 and at its bottom is linked to base 78 at spaced apart pivot points defined by pivot pins 90, so that the lever rotates slightly about the pivot pins as it shifts between the position in which tickets being counted are punched and the position in which the tickets are not punched. The top of lever 74 is connected to arm 76 specifically by means of pivot pin 90*a*. A coupling 92, comprising two links 94, a spacer 96, and a pivot pin 98, is used in linking the bottom of lever 74 to pivot pin 90*b* of base 78 in such a way as to allow the two links to rotatingly pivot around the pivot pin through a 180° arc. An annular notch 100 is formed on the inside edge of the lever having an elongated, semi-circular cross-section with a diameter approximately equivalent to that of pivot pin 90*b*.

Arm 76 extends through support plate 82 of sidewall 60 into the interior of the housing. A coiled helical spring 102 connects lever 74 with a hook 104, which in turn is connected to arm 76; the coiled helical spring applies a biasing force on the lever that tends to resist its pivotal rotation away from the housing, about pivot pin 90*a*.

Base 78, whose neck 106 is attached to support plate 82 by two screws 108, supports two base platforms 110, connected to each other at the neck but extending outwards from the support plate parallel to each other and separated by a space sufficient to allow the passage of tickets 58 between them. Platform 110*a*, located above its counterpart, extends furthest from support plate 82 and is linked to the bottom of lever 74 at pivot pin 90*b*. An aperture 112 is disposed through the center of platform 110*a* having a diameter slightly greater than that of punch rod 80. Platform 110*b*, located below its counterpart, extends a shorter distance from the support plate. A round die 114 is formed in platform 110*b* directly below aperture 112 having a diameter slightly greater than that of punch rod 80. Die 114 extends completely through platform 110*b* so that portions of each ticket punched are forced through the bottom of the die and away from base 78 and ticket count and punch assembly 48. Protruding from the front of platform 110*b* is a support rod 116 around which rotates a support roller 118. Two rectangular-shaped guide plates 120 are attached to opposing sides 122 of platform 110*a* by means of screws 124. Arm 76 fits between guide plates 120 and freely moves vertically between the guide plates.

The top part of punch rod 80 is coupled to arm 76 by a pivot pin 128 and the rod extends down through aperture 112. Depending upon the vertical position of arm 76, the bottom of rod 80 passes through a ticket into die 114 or does not exit aperture 112, thereby determining whether a ticket is punched and voided.

Figure 6:
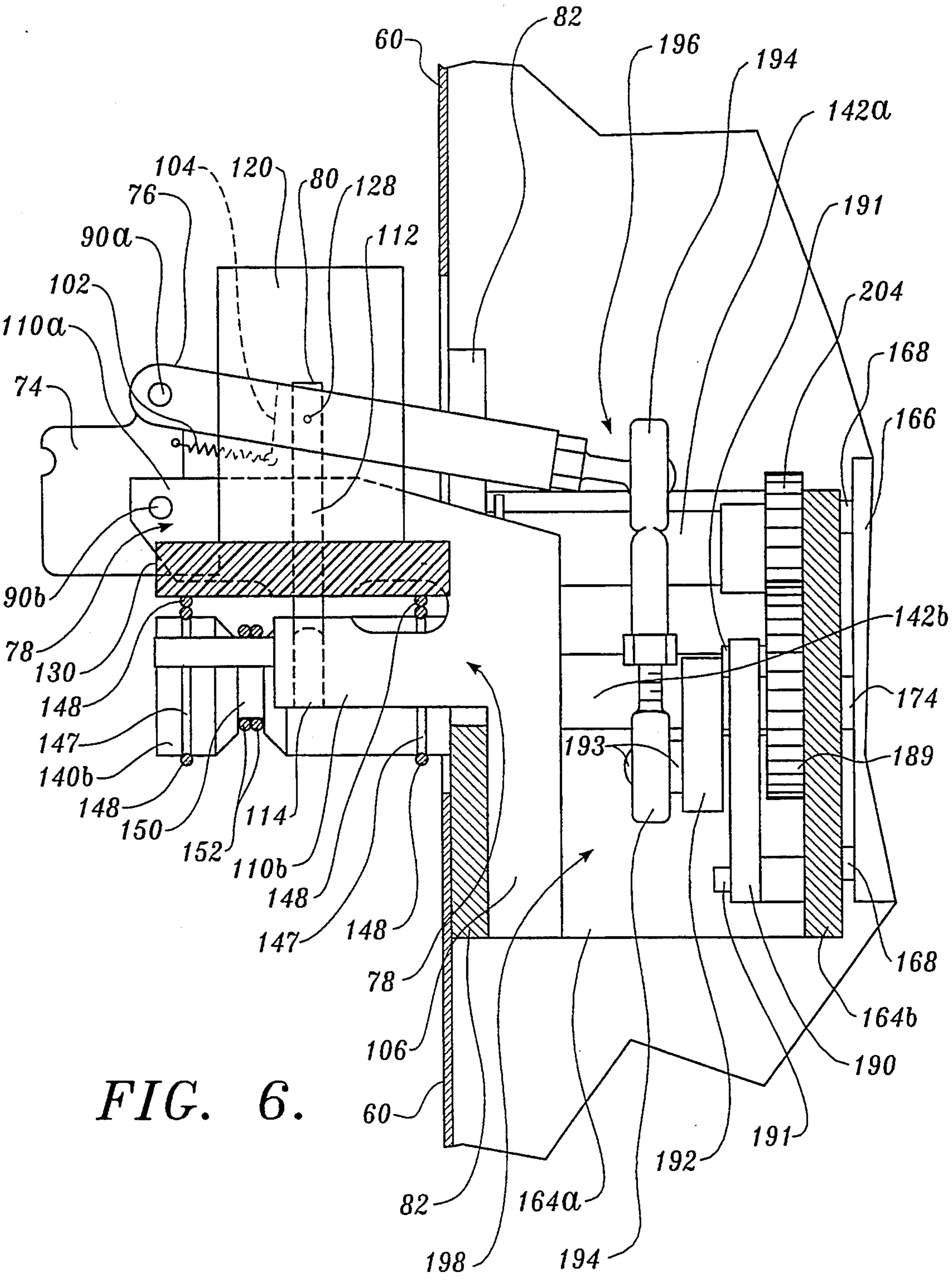
FIG. 6 is a cross-sectional view of a gear box and the ticket count and punch assembly, taken along section line 6—6 of FIG. 9.
Figure 6A:
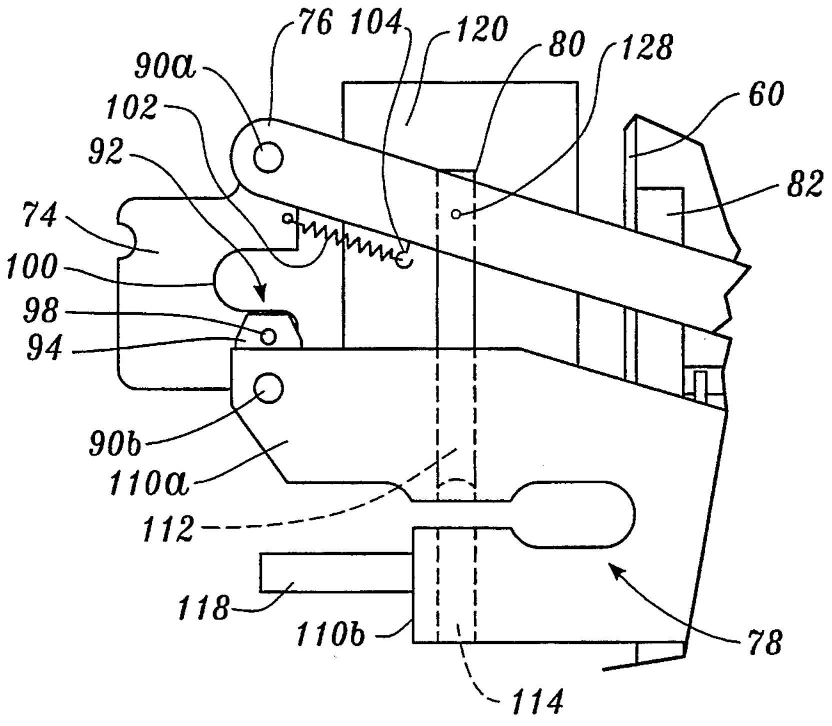
FIG. 6A is an expanded cross-sectional view of the ticket count and punch assembly of the invention of FIG. 6.

The two stable positions of lever 74 are shown in FIGS. 6 and 6A. In the down position in which tickets are punched (shown in FIG. 6), lever notch 100 fits securely around pivot pin 90*b* with coupling 92 compacted to the body of the lever. In the up position in which the lever is placed to stop the tickets from being punched (shown in FIG. 6A), lever notch 100 is shifted above pivot pin 90*b* and coupling 92 is fully extended such that the bottom of the lever is lifted and held above pivot pin 90*b* by links 94. The movement of the lever between these two positions is accomplished by pulling the lever outwards in a direction opposite the bias forced exerted by spring 102, away from the housing, and moving the lever down or up, thereby shifting the lever and attached punch rod 80 between two stable positions comprising the on or off position of ticket count and punch assembly 48, respectively.

Figure 5:
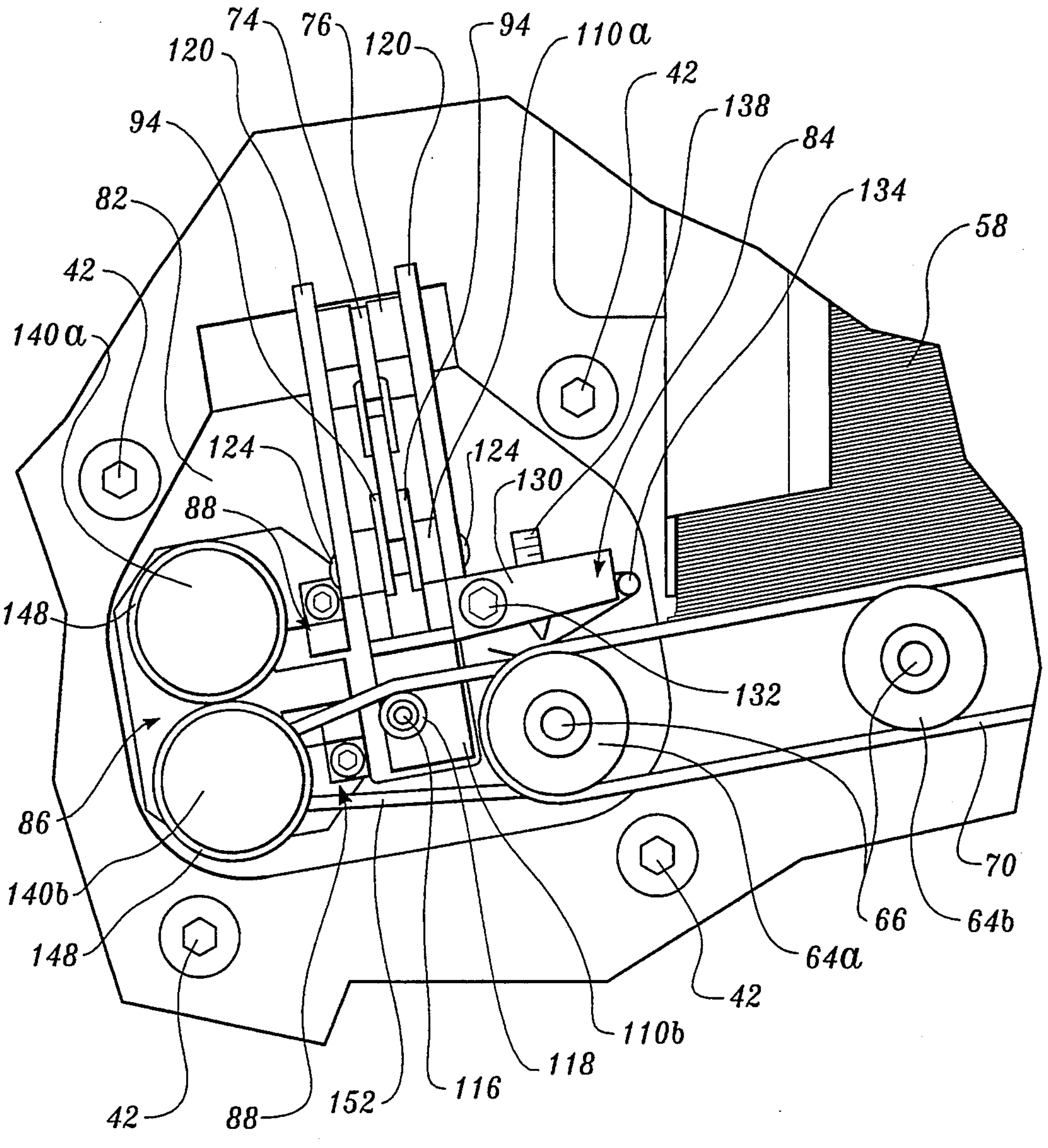
FIG. 5 is an expanded front elevational view of the ticket count and punch assembly with the protective cover removed.
Figure 7:
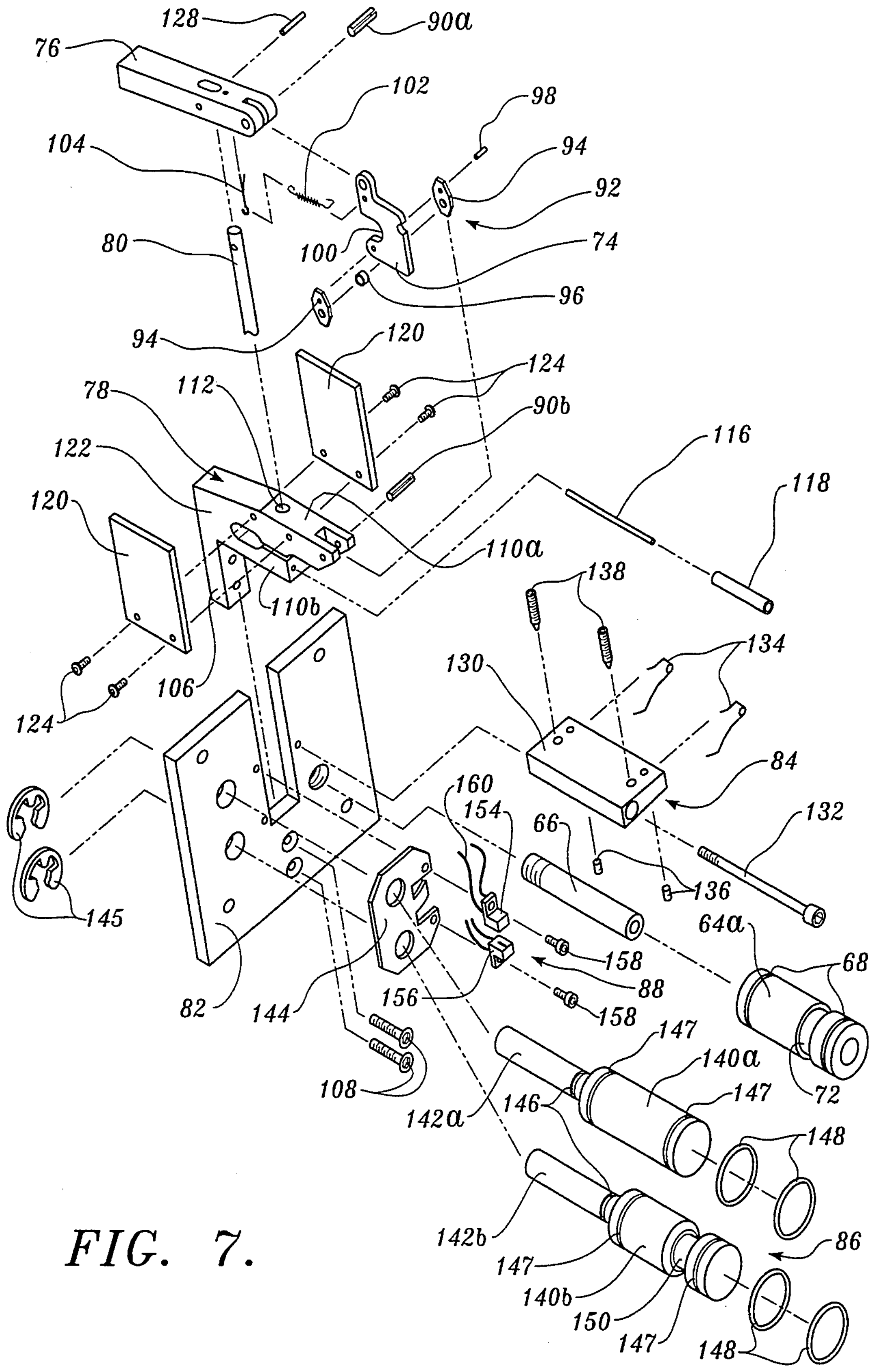
FIG. 7 is an exploded isometric view of the ticket count and punch assembly.

Friction pin assembly 84 is used to control the flow of tickets 58 as they advance along conveyor assembly 46 from input bin 44 to ticket count and punch assembly 48 as shown in FIGS. 5 and 7. The friction pin assembly comprises a block-shaped base 130 attached to support plate 82 by a bolt 132. Two hairpin springs 134 are attached to opposing ends of base 130 by two corresponding set screws 136. Each hairpin spring extends below base 130 at an acute angle to the direction in which the tickets are advanced by the conveyor to contact roller 64*a* of conveyor assembly 46. Two adjustment screws 138, each associated with one of the hairpin springs, extend downwards through friction assembly base 130 to contact springs 134 at the point in which the springs contact conveyor roller 64*a*. The purpose of hairpin springs 134 is to prevent more than one ticket at a time from advancing along the conveyor and through ticket count and punch assembly 48 from input bin 44. Adjustment screws 138, in turn, allow for altering the amount of pressure on hairpin springs 134 and therefore effectively control the thickness of the material (or the number of tickets) allowed into the ticket count and punch assembly at any given time. It should be noted that while only one ticket at a time is preferred, adjustment screws 138 can be set to allow two or more tickets to be advanced simultaneously.

Output roller assembly 86, shown in FIGS. 3, 5, 6 and 7, is used to advance counted tickets through and beyond the ticket count and punch assembly. The output roller assembly includes a top output roller 140*a* and a bottom output roller 140*b*, supported by and rotating around a corresponding top output roller shaft 142*a* and bottom output roller shaft 142*b*. A spacer plate 144 separates the output rollers from support plate 82, and output roller shafts 142 extend through the support plate and into the interior of housing 22. A snap ring 145 snaps into a corresponding annular groove 146 formed on each output roller shaft 142 on the inner side of support plate 82.

Each output roller 140 has annular grooves 147 formed adjacent its ends. O-rings 148, which are slightly smaller in circumference than the rollers, are seated in the grooves. These O-rings provide a relatively high coefficient of friction, and because the output rollers are spaced apart so that the O-rings on the top and bottom output rollers contact each other, each ticket passing through ticket count and punch assembly 48 is advanced by contact with the O-rings on the rotating output rollers out of output roller assembly 86.

Bottom output roller 140*b* also has an annular drive groove 150 that engages two drive belts 152. These drive belts extend between annular groove 150 on output roller 140*b* and conveyor drive groove 72 on conveyor roller 64*a*, supported by support roller 118. It should be noted that conveyor drive groove 72 of conveyor roller 64*a* and drive groove 150 of roller 140*b* are not of the same circumference, since conveyor drive groove 72 is shallower than drive groove 150. This differential circumference causes the rate of rotation of conveyor roller 64*a* to be less than that of output roller 140*b*. Conveyor roller 64*a* therefore moves conveyor belt 70 and thus conveyor assembly 46 at a slower rate than the rate at which the output rollers are being driven. The slower rate at which the conveyor moves each ticket into the ticket count and punch assembly relative to the rate at which the output rollers advance each ticket out of the ticket count and punch assembly serves an important function in the tally punch machine, for it acts to separate the tickets that pass through sensor assembly 88 by a distinct space. The space between each ticket is necessary for the sensor assembly to distinguish the passage of each ticket through ticket count and punch assembly 48 so that passage of each ticket causes the ticket count to increment by one.

Sensor assembly 88, shown in FIG. 7, produces an electrical signal indicating the passage of each ticket through ticket count and punch assembly 48. The sensor assembly includes a light source 154 and a light sensor 156, both of which are attached by screws 158 to support plate 82 through spacer plate 144. The light sensor can comprise a photoelectric cell, a phototransistor, or other light sensitive device. Located near output rollers 140, the light source and light sensor are positioned vertically apart from each other, with light source 154 facing light sensor 156, separated by the space through which each ticket advanced through the ticket count and punch assembly passes. Light sensor leads 160 extend from sensor assembly 88, through support plate 82, and into the interior of housing 22 for input to an electronic counter 183 (shown in FIG. 8 and discussed below). Alternatively, the light sensor assembly can use ambient light and light source 154 would be omitted.

Figure 8:
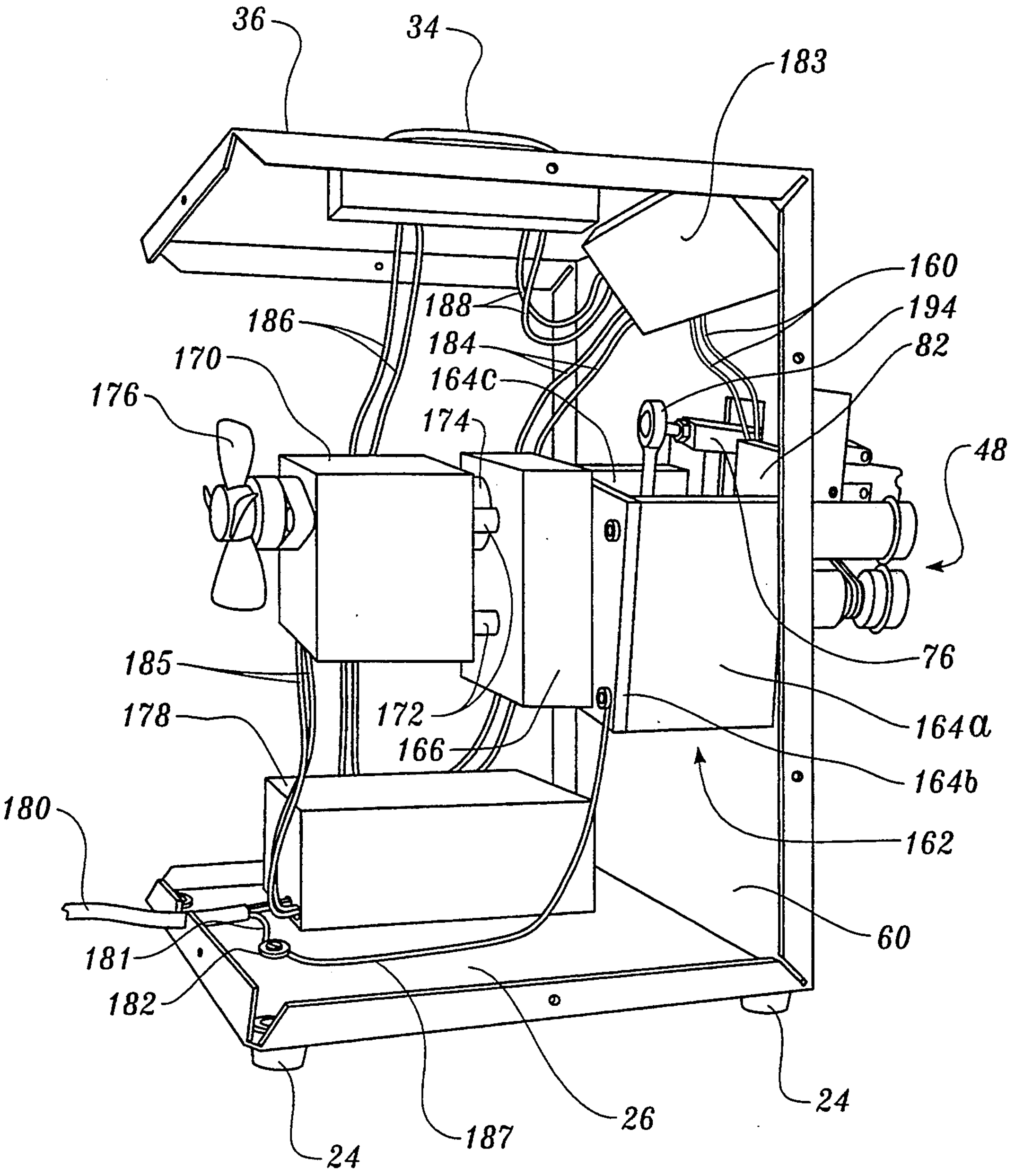
FIG. 8 is a side elevational view of the tally punch machine, with a removable portion of the housing removed to show its interior and with the protective cover removed.
Figure 9:
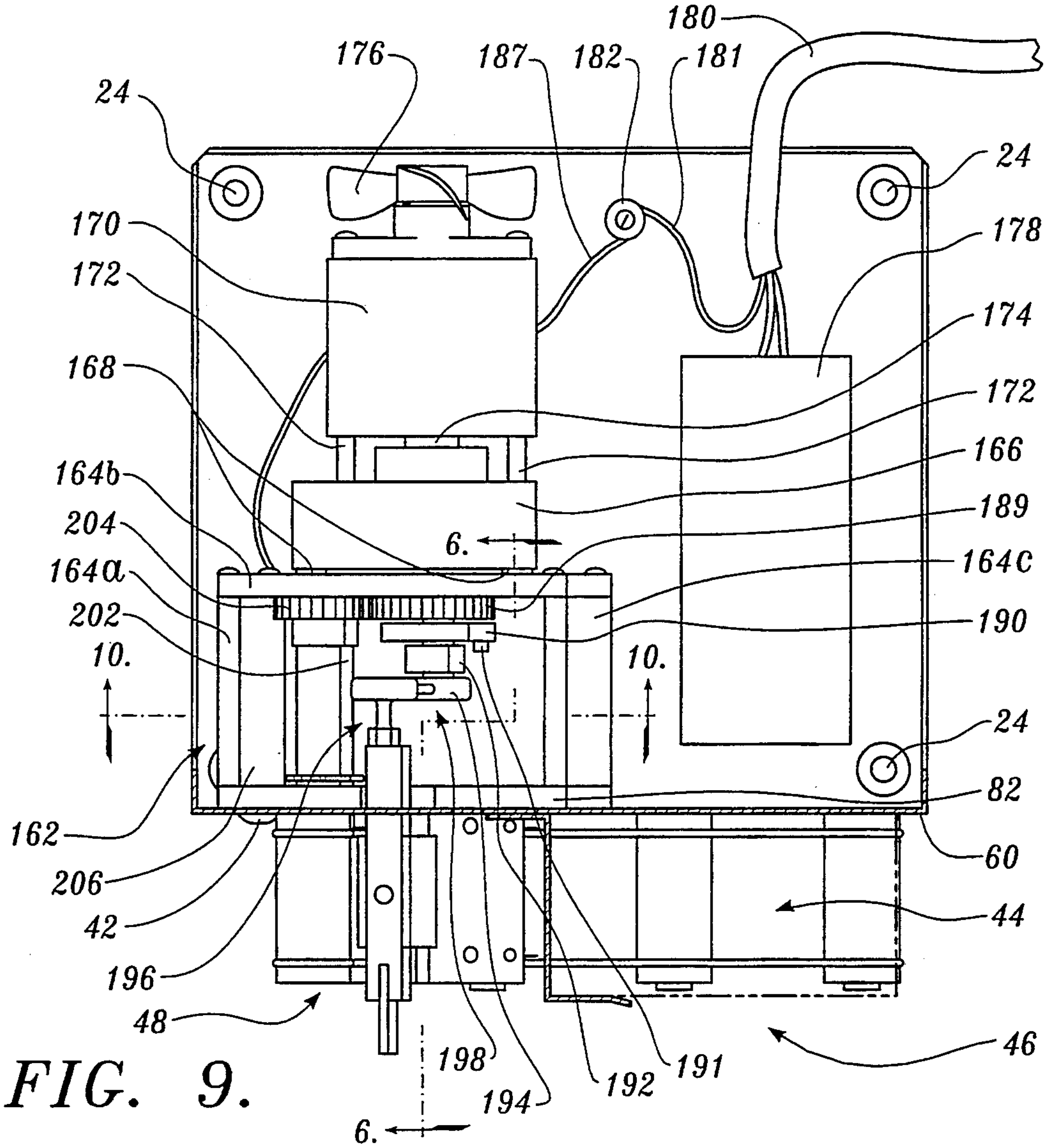
FIG. 9 is an interior cross-sectional view of the tally punch machine, taken along section line 9—9 of FIG. 4.
Figure 10:
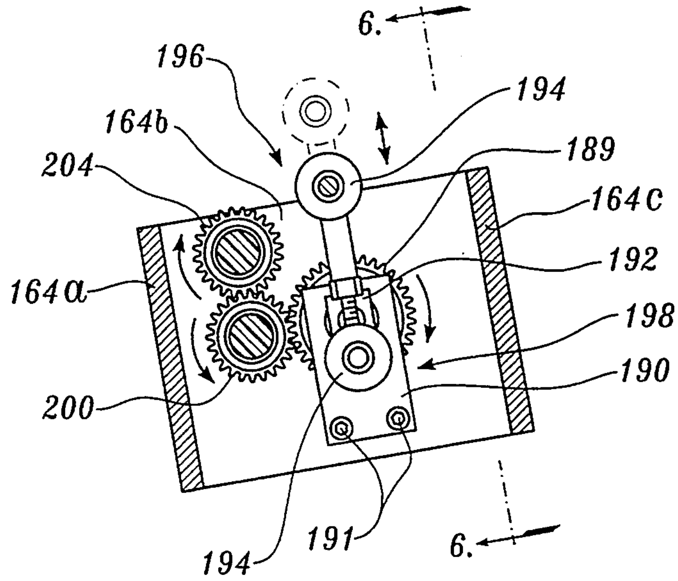
FIG. 10 is a fragmentary cross-sectional view of the gear box of the tally punch machine taken along section line 10—10 of FIG. 9.

The interior of the housing is shown in FIGS. 8 and 9. A gearbox 162, comprising three sidewalls 164 and support plate 82, is mounted by means of screws 42 to the inside of sidewall 60 of housing 22 in a position opposite that of ticket count and punch assembly 48 (located on the outside of the sidewall). A speed reduction transmission 166 is attached to gearbox wall 164*b* by screws 168. An electric motor 170, mounted to speed reduction transmission 166 by screws 172, has an output drive shaft 174 that is coupled to speed reduction transmission 166 to provide a rotational drive input. Motor 170 also drives a cooling fan 176 that is mounted on a side of the motor opposite that on which the speed reduction transmission is disposed. Motor 170 is electrically powered by 120 volts AC, or other available line current, as is a power supply 178, which is mounted to base 26, inside the housing.

A portion of a line cord 180 is shown for connecting power supply 178 to the AC line. A ground lead 181 from cord 180 ensures that the line current is properly grounded to a ground screw 182. An output of power supply 178 provides electrical power at an appropriate voltage to an electronic counter 183 (connected to digital display 56) by means of counter leads 184, and to motor 170 by means of motor leads 185. The power supply is connected to and controlled by switch 54*a* through power leads 186. A further ground lead 187 is shown connecting sidewall 164*b* of gear box 162 to ground screw 182.

Electronic counter 183, in the preferred embodiment consisting of an 8-bit counter integrated circuit (IC), is connected to controls 54*b*, 54*c*, 54*d*, 54*e*, and 54*f* by leads 188 and to sensor assembly 88 by sensor leads 160. Selections made by the operator setting controls 54 are input to the electronic counter, which controls both the output of digital display 56 and the flow of power to motor 170. Electronic counter 183 also controls power to light source 154 and receives input from light sensor 156 of sensor assembly 88.

When energized, light sensor 156 produces a signal indicative of the light level produced by light source 154. This electrical signal remains constant until the light sensor detects a substantial reduction in the light incident upon it, caused by the passage of a ticket between the light sensor and the light source. As the ticket moves beyond the sensor assembly, the level of the electrical signal rises and remains constant until the next ticket interrupts the light on the light sensor, producing a series of pulses, each pulse corresponding to a ticket being counted. The electronic counter responds to the rising or falling edge of each pulse and increments its count. The total count is conveyed from the counter IC to digital display 56 for viewing by the operator. If switch **54*b* is set to count a predetermined number of tickets set by knobs 54*c* and 54*d*, then when the counter IC total equals the specified number, electronic counter 183 shuts off the power to motor 170, which stops conveyor assembly 46 and ticket count and punch assembly 48. Conversely, if switch 54*b*** is set to count continuously, the count has no effect and the motor, conveyor assembly, and ticket count and punch assembly continue counting any tickets placed in the input bin.

Gearbox 162 of the tally punch machine is best understood by reference to FIGS. 6, 8, 9 and 10. Output drive shaft 174 extends from speed reduction transmission 166 to enter gearbox 162 through gearbox wall **164*b*. On the inside of gearbox 162, drive shaft 174 couples to a drive gear 189 and extends through a swing arm bracket 190, which is connected to gearbox wall 164*b* by screws 191, and into one end of a rectangular, block-shaped swing arm 192. A ball stub 193 is affixed to the side of swing arm 192 opposite the side connected to the output drive shaft and at the opposite end of the swing arm. A link 194 connects a universal joint 196 formed at one end of punch selection arm 76, with a universal joint 198 formed at the other end using ball stub 193**.

Drive gear 189 is mounted on and rotatably driven by output drive shaft 174, and is positioned so as to drivingly engage a bottom conveyor gear 200 that is rotatably mounted on gear box wall **164*b*. Connected to the bottom conveyor gear and extending through support plate 82 is bottom output roller shag 142*b*, which drivingly rotates bottom output roller 140*b*. Bottom conveyor gear 200 also drivingly engages a top conveyor gear 204, which is rotatedly mounted to gearbox wall 164*b*. Connected to the top conveyor gear and extending from it through support plate 82 is top output roller shaft 142*a*. The top output roller shaft drivingly rotates top output roller 140*a***.

Both conveyor assembly 46 and ticket count and punch assembly 48 are thus rotatably driven by output drive shaft 174 of motor 170. As viewed in FIG. 10, output drive shaft 174 drivingly rotates drive gear 189 in a clockwise direction, while bottom conveyor gear 200 and its associated bottom output roller shaft **142*b* rotate in a counter-clockwise direction, and top conveyor gear 204 and its associated top output roller shaft 142*a* rotate in a clockwise direction. The rotational motion of the output drive shaft thus advances tickets from input bin 44 along the conveyor assembly and into and through ticket count and punch assembly 48**.

Output drive shaft 174, directly coupled to swing arm 192, drivingly moves universal joint 198 in a circular path. Universal joint 196, coupled to punch selector arm 76 and linked to universal joint 198 by link 194, thus reciprocates up and down as the output drive shaft rotates through one revolution. This up and down motion is transferred to punch rod 80, which is connected to punch selection arm 76. If punch selection lever 74 is down (which selects the operating mode in which tickets are both counted and punched or voided), arm 76 moves the punch rod so that it punches holes through tickets as they pass through ticket count and punch assembly 48. If, on the other hand, punch selection lever 74 is up (in the position to deselect voiding the tickets), arm 76 raises the punch rod above the level of the passing tickets so as to prevent the punch rod from reaching or penetrating each passing ticket as it reciprocates up and down.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Apparatus for counting and selectively voiding tickets comprising:
   - (a) a bin for holding at least one ticket;
   - (b) an electronic counting device for selectively counting tickets;
   - (c) a ticket invalidator for optionally canceling each ticket, said ticket invalidator including a reciprocating ticket punch rod;
   - (d) a conveyor for advancing tickets from the bin past the electronic counting device and ticket invalidator; and
   - (e) a plurality of selection switches for controlling the electronic counting device, ticket invalidator, and conveyor, said plurality of selection switches including an invalidator control that selectively shifts the reciprocating ticket punch rod to one of two positions, including a first position in which the tickets are voided as they are counted and a second position in which the reciprocating ticket punch rod does not void the tickets as they are counted.

2. The apparatus of claim 1, wherein the electronic counting device comprises:
   - (a) a sensor for distinguishing each discrete ticket and producing a corresponding signal; and
   - (b) a counter for receiving the signal from the sensor and maintaining a cumulative total count of the tickets in response thereto.

3. The apparatus of claim 1, wherein the plurality of selection switches comprises:
   - (a) a first selection switch coupled to and controlling the electronic counting device, said first selection switch selecting one of a plurality of counting modes, including a first mode in which the conveyor stops when a predetermined number of tickets has been counted, and a second mode in which any tickets in the bin are counted; and
   - (b) a second selection switch that selectively controls application of a driving force to the conveyor.

4. Apparatus for counting and selectively voiding tickets, comprising:
   - (a) an input bin for holding at least one ticket;
   - (b) counting means for counting tickets placed in the input bin, comprising:

(1) sensing means for sensing the passage of each ticket and producing a signal indicative of the passage of each ticket;

(2) an electronic counting device for receiving the signal from the sensing means and maintaining a cumulative total count of the tickets;

(c) voiding means for selectively voiding the tickets by punching a hole therein, said voiding means including a reciprocating punch rod and means for shifting the reciprocating punch rod away from the tickets to selectively prevent the tickets from being voided thereby; and (d) a conveyor for advancing tickets from the input bin, past the counting means and voiding means.

5. The apparatus of claim 4, further comprising a switch coupled to and controlling the electronic counting device, said switch selecting one of a plurality counting modes, including a first mode in which the conveyor stops when a predetermined number of tickets has been counted, and a second mode in which the conveyor continues to run independent of the number of tickets counted.

6. Apparatus for counting and selectively voiding tickets comprising:

(a) an input bin for holding at least one ticket;

(b) a prime mover coupled to an output shaft, said prime mover drivingly rotating the output shaft;

(c) counting means for counting the tickets;

(d) voiding means, coupled to the output shaft, for voiding the tickets, said voiding means including:

(i) a lever that is adapted to be grasped by a user and moved between a first position in which the lever enables the voiding means to void the tickets by removing a portion of each ticket and a second position in which the voiding means remain coupled to the output shaft but do not void the tickets;

(ii) a punch rod having opposed ends;

(iii) an arm, connected to one end of the punch rod and coupled to the output shaft and the lever;

(iv) a punching base having an aperture through its body through which said one end of the punch rod is thrust through the ticket by the motion of the output shaft, the aperture maintaining the alignment of the rod to the ticket, said lever shifting the punch rod away from the punching base when in the second position to selectively prevent the punch rod from being thrust through the ticket; and (e) a conveyor coupled to and driven by the output shaft, said conveyor advancing tickets from the input bin past the counting means and voiding means.

7. The apparatus of claim 6, wherein the counting means comprise:

(a) sensing means for sensing the passage of each ticket and producing a signal indicative of the passage of each ticket; and (b) an electronic counting device for receiving the signal from the sensing means and maintaining a cumulative total count of the tickets.

8. The apparatus of claim 7, wherein the sensing means comprise a light sensor that produces the signal when a ticket passing the light sensor affects light incident on the light sensor.

9. The apparatus of claim 7, further comprising a switch for resetting the cumulative total to a predetermined number.

10. The apparatus of claim 7, further comprising a switch coupled to and controlling the electronic counting device for selecting one of a plurality counting modes, including a first mode in which the conveyor stops when a predetermined number of tickets has been counted, and a second mode in which the conveyor runs, independent of the number of tickets counted.

11. The apparatus of claim 6, wherein the conveyor comprises:

(a) a plurality of rollers, at least one of the plurality of rollers being coupled to the output shaft; and (b) at least one belt supported by the plurality of rollers and driven by at least one of the plurality of rollers to advance the conveyor.

12. The apparatus of claim 11, further comprising stop means for stopping the conveyor from advancing more than one ticket at a time past the counting means.

13. The apparatus of claim 11, further comprising:

(a) a speed reduction transmission having an input coupled to the output drive shaft of the prime mover;

(b) a plurality of shafts, extending from the speed reduction transmission and coupled to the conveyor; and (c) a universal joint coupling the speed reduction transmission to the punch means.

14. The apparatus of claim 6, further comprising a friction block assembly that is used to limit only a single ticket at a time to be advanced by the conveyor past the counting means and the voiding means.

15. The apparatus of claim 14, wherein the friction block assembly includes adjustment means for adjusting the thickness of the tickets advanced by the conveyor.

16. The apparatus of claim 15, wherein the adjustment means comprise at least one spring.

17. Apparatus for counting and selectively voiding tickets comprising:

(a) an input bin for holding at least one ticket;

(b) a prime mover having an output shaft, said prime mover drivingly rotating the output shaft;

(c) counting means for counting the tickets;

(d) voiding means for selectively voiding the tickets as they are counted;

(e) a conveyor that advances tickets from the input bin past the counting means and voiding means;

(f) a speed reduction transmission having an input coupled to the output shaft of the prime mover;

(g) a plurality of shafts, extending from the speed reduction transmission and drivingly coupled to the conveyor; and (h) a universal joint drivingly coupling the speed reduction transmission to the voiding means.

* * * * *